United States Patent
Shaw et al.

[11] Patent Number: 5,811,183
[45] Date of Patent: Sep. 22, 1998

[54] ACRYLATE POLYMER RELEASE COATED SHEET MATERIALS AND METHOD OF PRODUCTION THEREOF

[76] Inventors: David G. Shaw, 1041 E. Calle Mariposa, Tucson, Ariz. 85718; Eric Dawson, 8851 N. Oracle Apt. #207; Daniel Cline, 8851 N. Oracle, Apt. #413, both of Tucson, Ariz. 85737; Marc Langlois, 4420 N. Camino De Carillo, Tucson, Ariz. 85715

[21] Appl. No.: 514,244

[22] Filed: Aug. 11, 1995

Related U.S. Application Data

[63] Continuation-in-part of Ser. No. 417,605, Apr. 6, 1995, abandoned.

[51] Int. Cl.$^6$ .............................. B32B 27/00; B32B 9/06
[52] U.S. Cl. .................. 428/336; 428/421; 428/446; 428/447; 428/452; 428/481; 428/513; 428/514
[58] Field of Search ...................... 428/332, 446, 428/447, 452, 513, 514, 537.5, 421, 481, 483, 511, 512, 517, 336

[56] References Cited

U.S. PATENT DOCUMENTS

| | | | |
|---|---|---|---|
| 4,177,310 | 12/1979 | Steeves | 428/216 |
| 4,201,808 | 5/1980 | Cully et al. | 428/40 |
| 4,490,774 | 12/1984 | Olson et al. | 361/311 |
| 4,537,811 | 8/1985 | Nablo | 428/166 |
| 4,647,818 | 3/1987 | Ham | 315/111.21 |
| 4,696,719 | 9/1987 | Bischoff | 202/205 |
| 4,781,942 | 11/1988 | Leyden et al. | 427/54.1 |
| 4,842,893 | 6/1989 | Yializis et al. | 427/44 |
| 4,873,140 | 10/1989 | McIntyre | 428/343 |
| 4,954,371 | 9/1990 | Yializis | 427/44 |
| 5,018,048 | 5/1991 | Shaw et al. | 361/323 |
| 5,021,298 | 6/1991 | Revell | 428/458 |
| 5,023,138 | 6/1991 | McIntyre | 428/352 |
| 5,032,461 | 7/1991 | Shaw et al. | 428/461 |
| 5,075,349 | 12/1991 | Ohba et al. | 522/99 |
| 5,082,915 | 1/1992 | Hara et al. | 528/15 |
| 5,084,354 | 1/1992 | Krankkala et al. | 428/414 |
| 5,097,800 | 3/1992 | Shaw et al. | 118/730 |
| 5,108,782 | 4/1992 | Reed | 427/54.1 |
| 5,125,138 | 6/1992 | Shaw et al. | 29/25.42 |
| 5,147,938 | 9/1992 | Kuller | 525/276 |
| 5,232,784 | 8/1993 | Kim | 428/451 |
| 5,418,304 | 5/1995 | Mueller et al. | 526/245 |
| 5,466,491 | 11/1995 | Factor et al. | 427/515 |
| 5,607,729 | 3/1997 | Medford | 427/495 |

FOREIGN PATENT DOCUMENTS

| | | |
|---|---|---|
| 2052321 | 3/1992 | Canada . |
| 340935 | 11/1989 | European Pat. Off. . |
| 521605 | 1/1993 | European Pat. Off. . |
| 1095822 | 12/1967 | United Kingdom . |
| WO 91/15610 | 10/1991 | WIPO . |
| WO 92/06243 | 4/1992 | WIPO . |
| WO 95/10117 | 4/1995 | WIPO . |

OTHER PUBLICATIONS

Shaw, David G. et al., "Use of Vapor Deposited Acrylate Coatings to Improve the Barrier Properties of Metallized Film", Paper presented at the Society of Vacuum Coating, Boston, Massachusetts, 1994.

Shaw, David G. et al., "A New High Speed Process for Vapor Depositing Acrylate Thin Films: An Update", Paper presented at the Society of Vacuum Coating, Dallas, Texas, 1993.

*Primary Examiner*—Hoa T. Le
*Attorney, Agent, or Firm*—Bell Seltzer Intellectual Property Law Group of Alston & Bird LLP

[57] ABSTRACT

Sheet materials according to the present invention comprise a sheet material substrate, such as for example a film or paper sheet, with a polymer release coating overlying and adhered to a surface of the sheet material substrate. Single and multilayer release coatings can be formed on the substrate by vapor deposition of silicone acrylates and/or fluorinated acrylates. These coatings can be applied in thickness of 0.05 micron to 1.0 micron to achieve a range of release properties. These coatings can be applied in a very thin single layer on relatively smooth substrates or in a multilayer form on rough substrates such as paper. The new coating process described here has lower process and materials costs, improved adhesion, low slip, and excellent release characteristics.

23 Claims, 3 Drawing Sheets

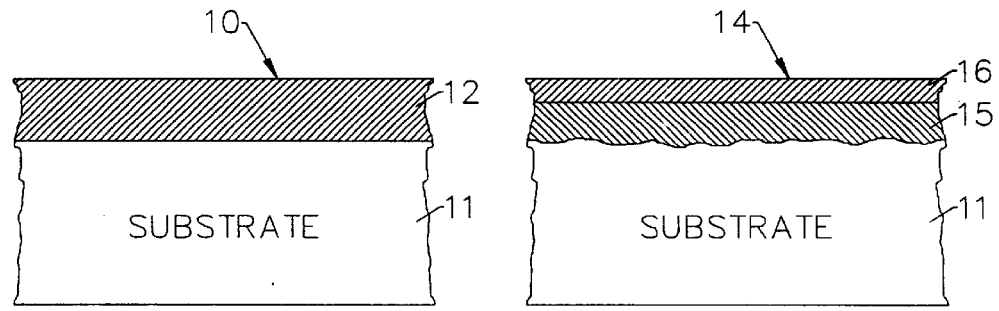
FIG. 1A.
FIG. 1B.
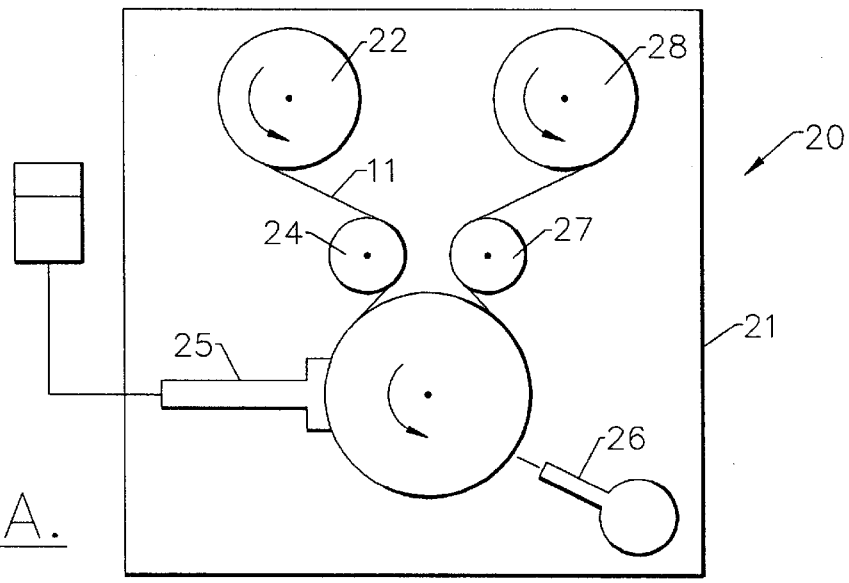
FIG. 2A.
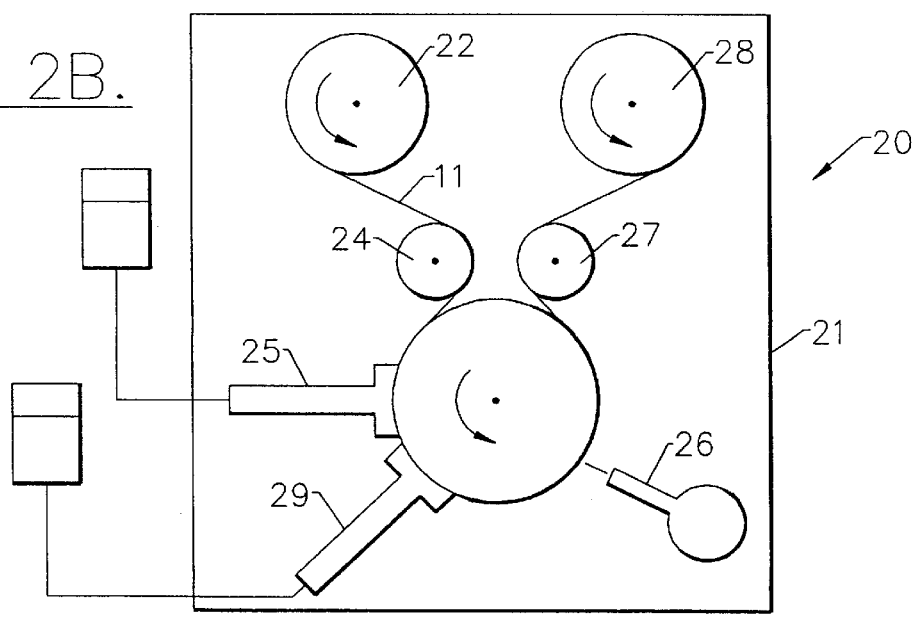
FIG. 2B.

ACRYLATE POLYMER RELEASE COATED SHEET MATERIALS AND METHOD OF PRODUCTION THEREOF

CROSS REFERENCE TO RELATED APPLICATION

This application is a continuation-in-part of copending U.S. application Ser. No. 08/417,605filed Apr. 6, 1995, now abandoned.

FIELD OF THE INVENTION

This invention relates generally to sheet materials having acrylate polymer coatings thereon and to methods of producing such sheet materials. More particularly, the present invention relates to sheet materials, such as a paper or film, having a release layer formed by a silicone or fluorinated acrylate polymer coating and to methods of making the same.

BACKGROUND OF THE INVENTION

It is well known that silicon-containing and fluorine-containing materials can be used to provide coatings on a film or paper substrate that will release adhesive backed paper and film when they are needed for use. Some examples of applications that utilize these release coated liner carriers are labels, construction materials, medical packaging, tape, as well as many industrial materials. Such release liners are usually composed of a film or paper substrate and a silicone based release coating. There may be a smoothing pre-coating in the case of rough substrates, such as paper, which is generally composed of clay, extruded polyethylene, or some other additional smoothing layer. These silicone release coatings generally have a thickness above about 1 micron (1 GSM).

These release coatings are usually achieved by roller coating, in atmosphere, a solvent or water based material or a 100% solids material. These materials are cured either by evaporation of the water or solvent in an oven or by UV or electron beam irradiation. The later method is preferred. for very high speed coating of silicon acrylate compositions.

SUMMARY OF THE INVENTION

The present invention provides a new coating process for producing release liners with significant advantages over current approaches. According to the present invention, a silicon or fluorinated acrylate monomer is evaporated and condensed on a moving web under vacuum. The monomer may be thereafter crosslinked by exposure to radiation, such as electron beam or UV radiation, to form a cured, crosslinked release coating layer. This release layer can be deposited in thicknesses as low as a few tens or hundreds of angstroms at speeds in excess of 2000ft/min. Both single layer and multilayer coatings are contemplated. Both the multilayer and the single layer constructions use low molecular weight silicone and fluorinated acrylate monomers.

Accordingly, the present invention provides, according to one of the presently preferred embodiments disclosed herein, a sheet material comprising: a sheet material substrate; a polymer coating overlying and adhered to a surface of said sheet material substrate, said coating comprising a radiation cured crosslinked polymer derived from a vapor deposited silicon-containing or fluorine-containing acrylate prepolymer composition having a molecular weight in the range of from about 200 to 3000. Preferably, the polymer coating has a thickness of no more than 0.5 micron and is derived from vapor deposited 100 percent solids monomers and has no residual solvent present.

Also in accordance with the invention, there is provided a sheet material comprising: a sheet material substrate; and a release coating layer adhered to said substrate and forming an outer exposed surface for said sheet material, said release coating layer comprising a crosslinked solvent-free silicon-containing or fluorine-containing acrylate polymer having a thickness of no more than 0.2 micron.

The present invention further provides a sheet material comprising: a sheet material substrate; a polymer base coating layer overlying and adhered to a surface of said sheet material substrate, said base coating layer comprising a radiation cured crosslinked polymer derived from a vapor deposited acrylate prepolymer composition having a molecular weight in the range of from about 150 to 600; and a release coating layer adhered to and overlying said polymer base coating layer and forming an outer exposed surface for said sheet material, said release coating layer having a thickness of no more than 0.5 micron and comprising a radiation cured crosslinked polymer derived from a vapor deposited silicon-containing or fluorine-containing acrylate monomer.

The present invention also provides a method for producing a coated sheet material comprising: vaporizing a silicon-containing or fluorine-containing acrylate prepolymer composition having a molecular weight in the range of from about 200 to 3000; condensing the vaporized prepolymer composition and forming a coating thereof on a surface of a sheet material substrate; and subjecting the coating of condensed prepolymer composition to radiation to cure and crosslink the prepolymer composition and form a radiation cured crosslinked polymer coating on said substrate.

BRIEF DESCRIPTION OF THE DRAWINGS

These and other features and advantages of the present invention will become appreciated as the invention becomes better understood with reference to the specification, claims and drawings wherein:

FIGS. 1A and 1B are schematic cross sectional views of a substrate having an acrylate release layer according to principles of this invention;

FIGS. 2A and 2B are schematic views of apparatus for coating a substrate sheet material;

DETAILED DESCRIPTION

Figure 3A:
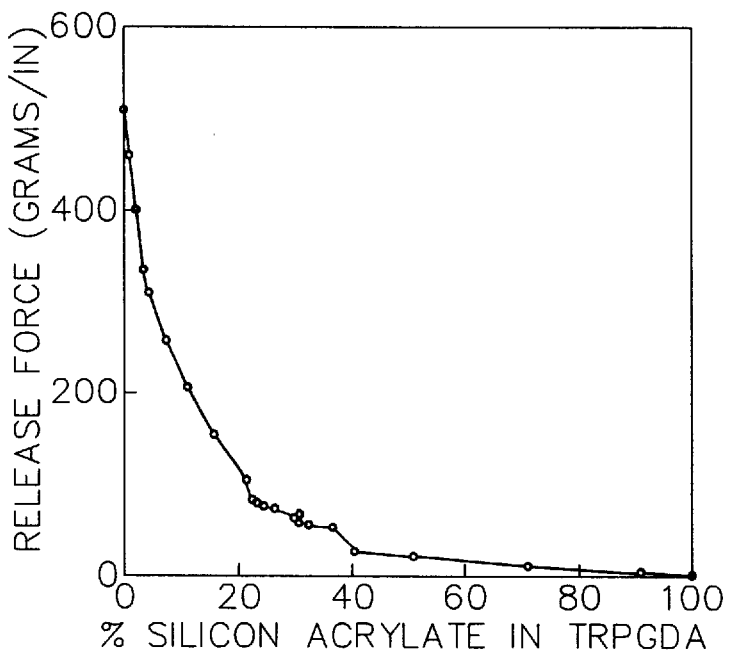
FIG. 3A is a graph showing the release force as a function of silicon acrylate composition for a 0.2micron coating on 12 micron polyethylene terephthalate (PET)

The present invention will be now described more fully as applied to several specific embodiments.

It should be understood, however, that these specific embodiments are provided for purposes of providing a better understanding of the invention and how it may be practiced in various ways. The specific embodiments illustrated and described herein are merely examples and should not be construed as limiting or restricting the scope of the invention.

FIGS. 1A and 1B illustrate two exemplary coating structures. It will be recognized that in the drawings, the various layers are drawn schematically and at a scale suitable for purposes of clarity and illustration, rather than at the scale of the actual material.

The structure 10 shown in FIG. 1A is a substrate 11 coated with a single layer coating 12 of a silicone or fluorinated acrylate monomer either by itself or as part of a blend. The structure 14 in FIG. 1B has two layers, the first is a smoothing, anchoring layer 15 which can be composed of an inexpensive acrylate monomer and the second layer 16 (which provides the release function) can be composed of a silicone or fluorinated acrylate monomer. This second 16 layer can be very thin (typically 0.05 to 0.2microns thick).

Structures such as those illustrated in FIGS. 1A and 1B as described above, as well as other multilayer coated products are preferably produced in a one-pass vapor deposition process that is carried out within a vacuum chamber. A suitable apparatus for carrying out this process according to the present invention is shown schematically in FIGS. 2A and 2B.

Referring to FIG. 2A, a continuous single-station coating and curing apparatus of the type suitable for producing a single layer coated structure such as that shown in FIG. 1A is indicated generally by the reference character 20. The entire apparatus is housed within a vacuum chamber 21. The monomer is fed into the evaporator where it is atomized into fine droplets and then flashed off the heated walls as a vapor. This molecular vapor is condensed on the moving web and then cured with curtain electron gun.

The substrate 11 in the form of a continuous web is stored on a rotatable pay-out reel 22 mounted adjacent a rotatable drum 23. The web forming the substrate is routed downwardly from the pay-out reel 22 around a guide roll 24 and onto the surface of the rotatable drum 23. The feed guide roll 24 serves to feed the web onto the surface of the drum 23 and maintain a predetermined degree of tension on the web. As the web is rotated with the drum 23 it passes by an acrylate evaporator 25. After being coated with the monomer layer, the substrate sheet passes a curing station 26 where the prepolymer layer is irradiated by a radiation source such as an electron gun or source of ultraviolet radiation. The UV radiation or electron bombardment of the prepolymer layer induces polymerization and crosslinking of the prepolymer, forming a first crosslinked polymer layer.

A take-up guide roll 27 is mounted adjacent the drum 23 at a location adjacent the feed guide roll 24. The take-up guide roll 27 serves to both maintain a predetermined degree of tension on the web and guide the web from the drum to a take-up reel 28.

FIG. 2A illustrates a configuration for producing a multilayer coated structure such as that shown in FIG. 1B. It is similar to arrangement shown in FIG. 2A and described above, and the same reference numbers are used to identify corresponding parts. This arrangement differs over that of FIG. 2A in that a second acrylate evaporator 29 is provided between the first evaporator 25 and the curing station 26. In the case of the multilayer coating (structure 15 in FIG. 1B) the smoothing and anchoring monomer layer 15 is first deposited and condensed and then the release monomer layer 16 is deposited and condensed. Then both layers are cured with one application of the electron gun. It is possible to cure each coating individually after deposition; however, curing both layers with one application of the electron gun produces a higher level of bonding between the two layers.

Evaporation of the composition is preferably from a atomized flash evaporation apparatus of the type described in U.S. Pat. Nos. 4,722,515, 4,696,719, 4,842,893, 4,954, 371 and/or 5,097,800. These patents also describe polymerization of an acrylate by radiation. In such atomizing and flash evaporation apparatus, liquid acrylate monomer is injected into a heated chamber as 1 to 50 micrometer droplets. The elevated temperature of the chamber vaporizes the droplets to produce a monomer vapor. The monomer vapor fills a generally cylindrical chamber with a longitudinal slot forming a nozzle through which the monomer vapor flows. A typical chamber behind the nozzle is a cylinder about 10 centimeters diameter with a length corresponding to the width of the substrate on which the monomer is condensed. The walls of the chamber may be maintained at a temperature in the order of 200 to 320° C. Two styles of evaporator are suitable. In one of them, the orifice for injecting droplets and flash evaporator is connected to one end of the nozzle cylinder. In the other style, the injector and flash evaporator section is attached in the center of the nozzle chamber like a T.

The coatings described here were applied at speeds up to 1500 ft/min. They were deposited on a common grade of 12 micron thick PET packaging film. These coatings have also been deposited on paper and polypropylene substrates. Both evaporator arrangements described in FIG. 2 were used for the single and multilayer coatings.

After being coated,the substrate sheet passes a curing station where the first prepolymer layer is irradiated by a radiation source such as an electron gun or source of ultraviolet radiation. The UV radiation or electron bombardment of the prepolymer layer induces polymerization and crosslinking of the prepolymer, forming a first crosslinked polymer layer.

In a preferred embodiment, a low-voltage electron beam gun is used as the irradiating source and is adjusted so that the electron beam emitted just penetrates the coating and is about 10 kilovolts per micrometer of coating but less than about 25 kilovolts. Adjusting the output of the electron beam gun so that it just penetrates the coating is desirable because it leaves the bulk of the underlying paper substrate untouched, thus eliminating the potential for paper embrittlement and promoting the formation of a coated paper product having a higher fiber tear and tensile strength than the uncoated paper. The use of a vacuum deposition process allows for the use of low-voltage electron beam curing and, thus avoids any damage to the substrate.

The silicone acrylates are preferably low molecular weight materials generally in the 200 to 600range. Typical of these is the Ebercryl 350 made by UCB Radcure. The fluorinated acrylates are preferably fluorinated monoacrylate with a molecular weight in the 300 to 3000 range. Various acrylates can be used as smoothing and anchoring layer in the multilayer structure. Preferably, the acrylates used in the smoothing and anchoring layer are acrylates having a molecular weight within the range of from about 150 to 600. Tripropylene glycol diacrylate and hexane diol diacrylate are typical examples of these.

The fluorinated acrylates were found to be poor film formers by themselves but did form good films when mixed with other crosslinking acrylates such as tripropylene glycol diacrylate. The fluorinated acrylate were found to be immiscible with the most common acrylate monomers, consequently, there was a problem to feed the blend into our evaporator in a consistent way. The solution to this problem was to feed the fluorinated acrylate separate from the other acrylates and to evaporate them together in the same evaporator unit. In this way the vapors mix and are condensed together as a true mixture and are immediately cured before they have a chance to separate. Thus, we are able to use immiscible materials to make homogeneous coatings.

The coatings were evaluated by adhering 3M 610 tape to the coated surface and measuring the force necessary to remove the tape. The force was measured either on an Instron or a calibrated force scale. The release force was measured immediately after coating and as a function of time after coating.

The transfer release force was also measured by the Keil Test. This is the release force of 3M 610 tape applied to the aluminum plate. The change in the release force as a function of time after the application of the tape to the release liner was also measured.

The contact angle of distilled water on the coated surface was also studied. This was measured using a Loretzen and Wettre contact angle apparatus. The coefficient of friction of two coated surfaces in contact with each other was also measured.

Table 1 describes the release force measured in pulling 610 3M tape from commercial packaging grade of polyester film coated by the evaporation process with a 0.5 micron coating of two common acrylate monomers, and polyester film coated with 0.05 and 0.5microns of a silicon acrylate. It also contains a comparison of a 0.5 micron fluorinated acrylate coating deposited in a single layer and in a multilayer form with the first layer being a 0.5 micron layer of tripropylene glycol diacrylate (TPGDA).

TABLE 1

| | Release force (Grams/inch) |
|---|---|
| Uncoated PET (12 micron polyester film) | 450 |
| PET + 0.5 μm hexane diol diacrylate | 500 |
| PET + 0.5 μm tripropylene glycol diacrylate | 450 |
| PET + 0.5 μm silicone diacrylate | 20 |
| PET + 0.05 μm silicone diacrylate | 80 |
| PET + 0.5 μm fluorinated diacrylate | 9 |
| PET + 0.5 μm TPGDA acrylate + 0.5 μm fluorinated diacrylate | 5 |

From this data it is clear that the release force can be greatly reduced by coating a substrate with thin layers of silicone or fluorinated acrylates. There is also a dependence of the release force on the thickness of the silicone acrylate coating. This thickness effect may be due to the incomplete coverage by the acrylate over all of the microscopic rough areas on the film during coating.

The data also shows a benefit to using the multilayer coating method compared to the single layer. The first layer smoothes the substrate and anchors the release acrylate coating to the PET. It is likely that even thinner release layers can be used together with thicker smoothing layers.

Figure 3B:
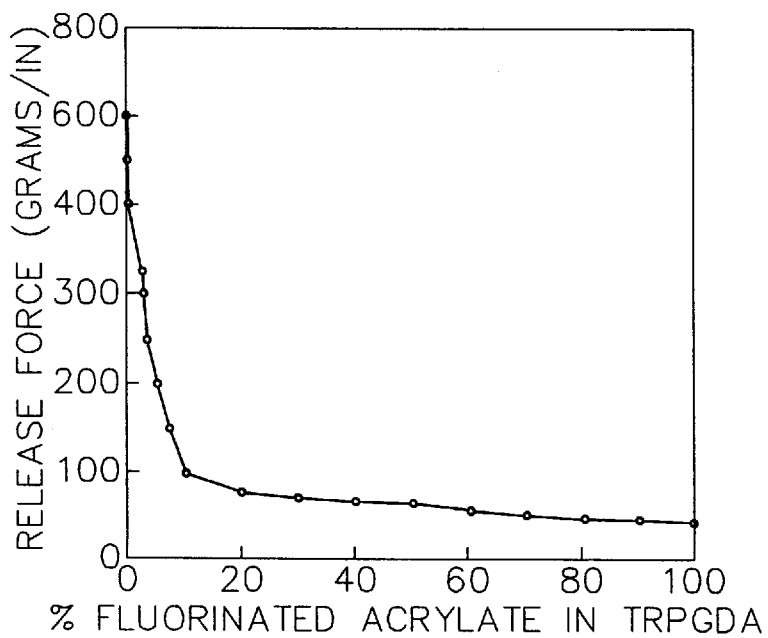
FIG. 3B is a graph showing the release force as a function of fluorinated acrylate composition for a 0.2 micron coating on 12 micron polyethylene terephthalate (PET)

The release force of 0.2 micron thick acrylate coatings was measured as a function of compositions of silicone or fluorinated acrylates mixed in TPGDA. The results are shown in FIGS. 3A and 3B. Here we see that a small amount of silicone or fluorinated acrylate in TPGDA has a large effect in decreasing the release force between the 3M 610 tape and the coating surface. The actual release force can therefore easily be controlled by varying the composition of the acrylate monomer blend.

Figure 4:
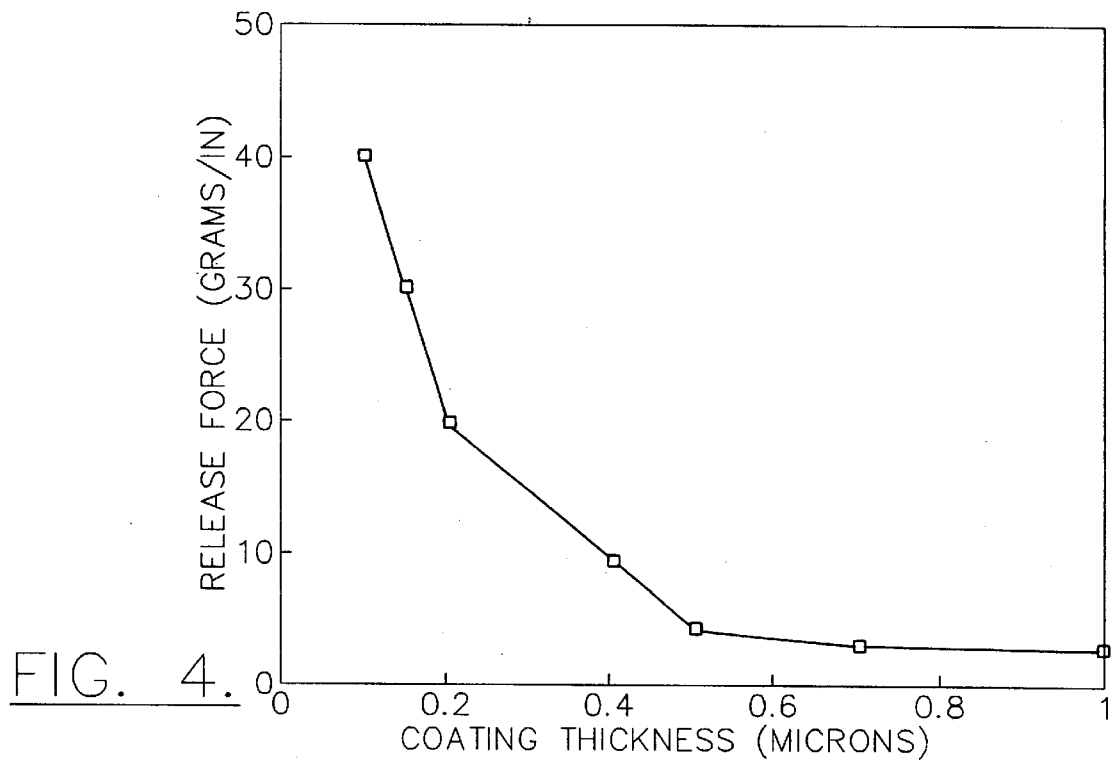
FIG. 4 is a graph showing the release force for fluorinated acrylate coatings of various thicknesses on 12 micron polyethylene terephthalate (PET) film.

In Table 1 above there is an indication that there is a thickness dependence for the release force. To investigate this we applied coatings of a fluorinated acrylate monomer in thicknesses ranging from 0.1 to 1.0 micron. These coatings were applied to 12 micron PET film. The results are shown in the FIG. 4, which shows that the release force does decrease as we increase the thickness of the fluorinated acrylate coating. We have seen a similar effect with other silicone and fluorinated acrylate coatings. By varying the thickness of the release coating we have another way to obtain a specified release force.

Another measure of the quality of the release coating is whether or not any of the release coating is transferred to the adhesive when the tape is stripped from the coating. This is determined by performing the release force measurement and then adhering this same piece of tape to a metal plate and measuring the release force to the metal plate. A good release coating will have the same release force to the metal plate that the fresh tape would have.

This measurement is made to check the transfer of the release coating to the adhesive of the tape. The fresh tape when applied to a smooth aluminum plate had a release force of about 400 grams/inch. When this tape was adhered to the fluorinated or silicone acrylate first and then adhered to the aluminum plate we obtained the same 400 grams/inch value. From this test, one can conclude that there is no transfer of the acrylate to the tape during contact or removal of the tape from the release coating.

Figure 5:
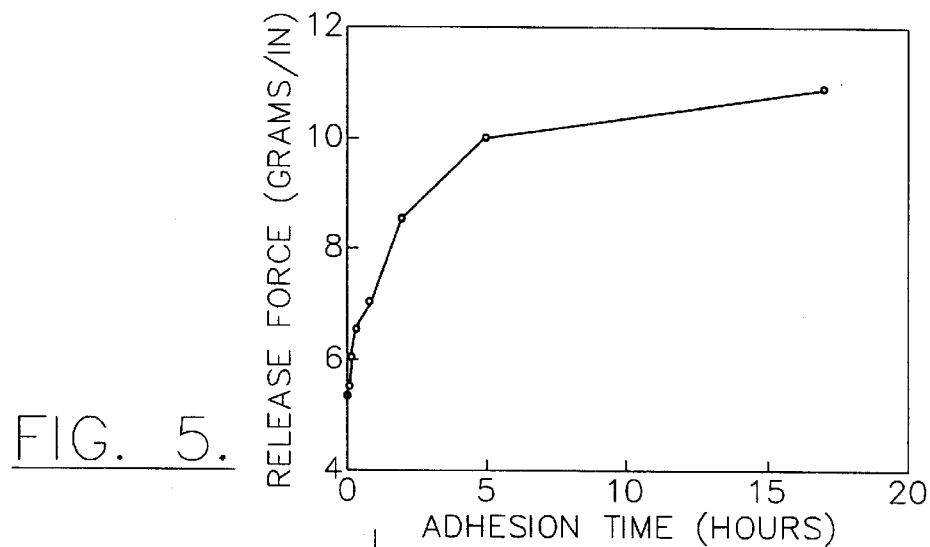
FIG. 5 is a graph showing the release force measured as a function of tape adhesion time.

A further test of this release coating involves measuring the release force as a function of time. This measurement was made to determine if the adhesion of the tape to the release coating would change with age; thus providing an indication of whether or not the release coating is migrating into the adhesive of the tape. The results of this test are shown in the FIG. 5. Here we see that the release force does increase from about 5 grams/inch to about 11grams/inch while the tape is adhering to the release coating. It is unknown whether this increase is due to something migrating from the release coating into the tape adhesive or something migrating from the tape adhesive into the release coating. The release coating here is a fluorinated diacrylate and should be well anchored to the substrate. Any slight volatile material in the starting monomer is removed during the atomizing and evaporation process and is either trapped by cryogenic traps or in the vacuum pumps.

Contact Angle

Figure 6:
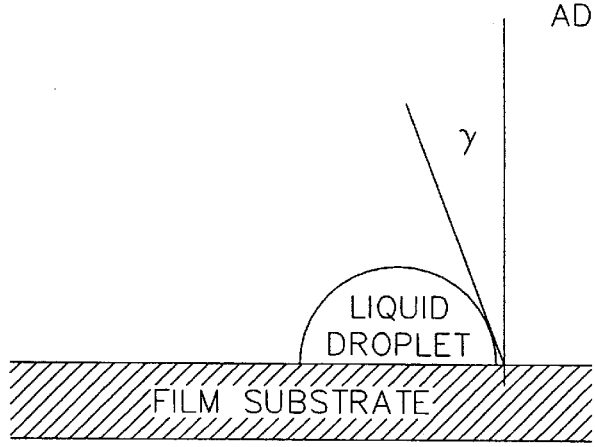
FIG. 6 is a schematic diagram illustrating the definition for contact angle $\gamma$.

The contact angle of water on the various acrylate materials was measured. The contact angle is defined as the angle shown in FIG. 6. The values that were measured are shown in Table 2 below.

TABLE 2

| | Contact Angle (in Degrees) |
|---|---|
| Uncoated PET (12 micron polyester film) | 30 |
| PET + 0.5 μm hexane diol diacrylate | 30 |
| PET + 0.5 μm tripropylene glycol diacrylate | 30 |
| PET + 0.5 μm fluorinated diacrylate | −2 |
| PET + 0.5 μm silicone diacrylate | 10 |

Here we see that the PET film has a value of about 30. The common acrylate coatings, HDODA and TPGDA, both also have a contact angle of about 30. The silicone acrylate coating drops the contact angle to about 10 degrees. The fluorinated acrylate has an even more dramatic effect of dropping the contact angle to about −2. This gives the surface a hydrophobic Teflon-like characteristic.

Coefficient of Friction

The coefficient of friction was measured as a function of the chemistry of the acrylate coating on 12micron PET film. The coated surface was measured against itself. The results are shown in Table 3.

TABLE 3

|  | Coefficient of Friction |
| --- | --- |
| PET + 0.5 μm hexane diol diacrylate | >10 |
| PET + 0.5 μm tripropylene glycol diacrylate | >10 |
| PET + 0.5 μm fluorinated diacrylate | 6 |
| PET + 0.5 μm silicone diacrylate (0.1% in 99.9% TPGDA blend) | 0.34 |
| PET + 0.5 μm silicone diacrylate (1.0% in 99.0% TPGDA blend) | 0.40 |

Here we see that the common acrylate monomers, HDODA and TPGDA, have a dramatic effect of increasing the coefficient of friction. A small amount of silicone acrylate acts as a slip agent to greatly reduce the surface friction. The fluorinated acrylate does not greatly reduce the coefficient of friction.

Advantages of Evaporated Release Coatings

The release coatings described above were all deposited by a high speed evaporation process and cured with a low voltage electron gun. Some advantages of this process compared to the conventional processes are as follows:

No oxygen inhibition of the curing process. Since the curing takes place in a vacuum chamber and the cured coating is kept under vacuum for several minutes the cure can proceed to completion. This will reduce the amount of uncured components in the coating. Also, it provides for increased cure speed.

A study of the fate of the free radicals formed during radiation curing has shown that a very high number of free radicals remain even 10 minutes after curing. This measurement was made by freezing the cured acrylate coating in liquid nitrogen immediately after irradiation and thus preventing the reaction of the free radicals. The number of free radicals were then measured by electron spin resonance.

This measurement was made as a function of time and temperature after irradiation. It showed that many free radicals existed at room temperature even 24hours after irradiation but that they decayed very rapidly at 100 C.

In a non-vacuum process where oxygen is present, it will diffuse into the coating and will react with the long lived free radicals and reduce the cure level.

High process speeds can be achieved since the electron beam provides a very high curing dosage. In conventional high voltage electron beam curing most of the electrons pass through the coating and dump their energy into the substrate. In this vacuum coating process, however, the electron voltage can be adjusted to only just penetrate through the coating. Almost all of the curing energy is dumped into the coating providing for very high dose levels and higher cure rates.

No damage to the substrate by electron penetration. The electrons penetrating the substrate can cause embrittling. This does not happen with the low voltage electron curing since they do not penetrate the substrate.

Lower thickness coatings. Using an evaporation process uniform coatings can be deposited at thicknesses below 0.05 microns. Since release is a surface effect it should be possible to develop release coatings with thicknesses that are a fraction of the current thicknesses. This should lower the coating cost significantly. In addition the process speeds for thinner coatings will be higher.

Improved anchoring of the acrylate release layer to the substrate. The evaporation process is particularly well suited to multilayer deposition. By first depositing a smoothing layer and then immediately afterward a release layer the release layer is reacted into the first layer and a very high level of adhesion can be achieved. The acrylate layer adhesion on these coatings is extremely high.

Elimination of the release liner. The ability to deposit a release coating on one side of a plastic label stock, and then print and apply the adhesive to the other side thus eliminating the need for a liner.

The acrylate evaporation process has been shown to have advantages for release coating applications. The silicone and fluorinated acrylate family of materials are well suited to provide the needed release characteristic. By varying the composition and/or the thickness of the release coatings, the level of release can be controlled. Using the evaporation process ultra thin release coatings can be achieved.

The term "polymer" is used herein in the general and generic sense, and is intended to be inclusive of homopolymers, copolymers, terpolymers and polymer blends.

Fluorinated acrylates with molecular weights higher than 600 can be successfully evaporated and applied by vapor deposition and used for forming a deposited acrylate layer. For example, a fluorinated acrylate with a molecular weight of about 2000evaporates and condenses similar to a non-fluorinated acrylate having a molecular weight in the order of 300.The acceptable range of molecular weights for fluorinated acrylates is about 300 to 3000.Fluorinated acrylates include monoacrylates, diacrylates, and methacrylates.

A release coating can be formed by depositing a layer of a silicon-containing acrylate according to the above described method onto the substrate layer or underlying prepolymer layer. One particularly suitable material for forming a release coating is Radcure Ebercrul 350 silicone diacrylate. Coatings with very low release force (less than 40 grams/inch) can be produced. An acrylate blend was used wherein one component was a silicone or fluorinated acrylate component of about 50% of the composition and the balance was a 50/50 blend of TRPGDA and Henkel 8061.In the multilayer coating of FIG. 2B, the top layer 16 contains a fluorinated or silicone acrylate component of 50% or more of the total blend and is preferably applied as a very thin layer, no more than about 0.2microns in thickness. Good release properties can be achieved with a top layer thickness of only a few tenths or hundredths of a micron thickness. Since silicone acrylates and fluorinated acrylates are generally expensive, this provides a significant cost benefit. The underlying layer 15 may either contain a lower percentage of the fluorinated or silicone component or may contain no fluorinated or silicone component. Layer 15 serves to anchor the release layer to the substrate and provide outstanding adhesion to the plastic substrate.

Silicone acrylates have heretofore been used in an acrylate blend and cured with either UV or electron beam to provide a release coating. These coatings are typically applied with rollers in a thickness of about 1 micron. By diluting the composition with solvents, the coating thickness may be reduced somewhat below this thickness. However, the use of solvents in the work environment presents certain disadvantages. In any event, it has not heretofore been possible to produce solvent free silicone acrylate coatings with a thickness of less than about 0.5 micron. In accordance with the present invention silicone acrylate release coatings on the order of 0.1 micron and less in thickness can be produced.

Many modifications and variations in release coated sheet materials and methods for making the same will be apparent to those skilled in the art. For example, the sequence of coating operations and the coated substrate may be varied appreciably. Thus, it will be understood that within the scope of the following claims this invention may be practiced otherwise than as specifically described.

That which we claim is:

1. A sheet material comprising:
   a sheet material substrate;
   a polymer release coating overlying and adhered to a surface of said sheet material substrate and imparting release properties to the sheet material, said coating having a thickness of no more than 0.5 microns and comprising a radiation cured crosslinked polymer derived from a vapor deposited silicon-containing or fluorine-containing acrylate prepolymer composition having a molecular weight in the range of from about 200 to 3000.

2. A sheet material according to claim 1 wherein said polymer coating is derived from vapor deposited 100percent solids monomers and has no residual solvent present.

3. A sheet material according to claim 1 wherein said silicon-containing or fluorine-containing acrylate prepolymer composition comprises at least 20 % by weight of a polyfunctional acrylate monomer having a molecular weight of 200 to 3000.

4. A sheet material according to claim 1 wherein said prepolymer composition comprises a silicone acrylate having a molecular weight of from 200to 600.

5. A sheet material according to claim 1 wherein said prepolymer composition comprises a fluorinated acrylate having a molecular weight of from 300 to 3000.

6. A sheet material according to claim 1 wherein said polymer coating comprises a radiation cured crosslinked polymer derived from a blend of a silicon-containing or fluorine-containing acrylate monomer and an acrylate monomer having a molecular weight in the range of from about 200 to 600.

7. A sheet material according to claim 6 wherein said acrylate monomer has a viscosity of no more than 200 centistokes at 25° C.

8. A sheet material according to claim 6 wherein said silicon-containing or fluorine-containing monomer comprises at least 50 percent by weight of said blend.

9. A sheet material according to claim 1 wherein said polymer coating comprises a first crosslinked acrylate polymer layer overlying and adhered to said surface of said substrate and a second crosslinked acrylate polymer layer overlying and adhered to said first polymer layer, and wherein said second crosslinked polymer layer comprises said polymer derived from a silicon-containing or fluorine-containing acrylate monomer.

10. A sheet material according to claim 9 wherein said second crosslinked acrylate polymer layer comprises a radiation cured crosslinked polymer derived from a blend of said silicon-containing or fluorine-containing acrylate monomer and a polyfunctional acrylate monomer having a molecular weight in the range of from about 200 to 600.

11. A sheet material according to claim 10 wherein said first crosslinked acrylate polymer layer comprises a radiation cured crosslinked polymer derived from at least 20% by weight of a polyfunctional acrylate monomer having a molecular weight in the range of from about 200 to 600.

12. A sheet material according to claim 9 wherein said first polymer layer is derived from an acrylate prepolymer composition having molecular weight within the range of from about 150 to 600.

13. A sheet material according to claim 9 wherein said second crosslinked polymer layer has a thickness of no greater than 0.5 micron.

14. A sheet material according to claim 9 wherein said first crosslinked polymer layer has a thickness of no greater than 0.5 micron.

15. A sheet material according to claim 1 wherein said sheet material substrate comprises a polymer film.

16. A sheet material according to claim 15 wherein said polymer film comprises a polyolefin or polyester film.

17. A sheet material according to claim 1 wherein said sheet material substrate comprises paper.

18. A sheet material comprising:
    a sheet material substrate;
    a release coating layer overlying said substrate and forming an outer exposed surface for said sheet material, said release coating layer comprising a vapor deposited crosslinked solvent-free silicon-containing or fluorine-containing acrylate polymer having a thickness of no more than 0.2 micron.

19. A sheet material according to claim 18 wherein said release coating-layer has a thickness of less than 0.1 micron.

20. A sheet material according to claim 19 additionally including a polymer base coating layer adhered to and overlying said sheet material substrate, and wherein said release coating layer is adhered to and overlies said polymer base coating layer.

21. A sheet material according to claim 20 wherein said release coating layer has a thickness below about 0.5 microns and said polymer base coating layer has a thickness above about 0.5 microns.

22. A sheet material according to claim 20 wherein said polymer base coating layer comprises a radiation cured crosslinked acrylate polymer.

23. A sheet material comprising:
    a sheet material substrate;
    a polymer base coating layer overlying and adhered to a surface of said sheet material substrate, said base coating layer comprising a radiation cured crosslinked polymer derived from a vapor deposited acrylate prepolymer composition having a molecular weight in the range of from about 150 to 600; and
    a release coating layer adhered to and overlying said polymer base coating layer and forming an outer exposed surface for said sheet material, said release coating layer having a thickness of no more than 0.5 micron and comprising a radiation cured crosslinked polymer derived from a vapor deposited silicon-containing or fluorine-containing acrylate monomer.

* * * * *